(12) United States Patent
Mende (10) Patent No.: US 9,464,614 B2
(45) Date of Patent: Oct. 11, 2016

(54) TORQUE TRANSMISSION DEVICE (71) Applicant: Schaeffler Technologies GmbH & Co. KG, Herzogenaurach (DE)

(72) Inventor: Hartmut Mende, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 136 days.

(21) Appl. No.: 14/361,845

(22) PCT Filed: Nov. 14, 2012

(86) PCT No.: PCT/DE2012/001090
§ 371 (c)(1),
(2) Date: May 30, 2014

(87) PCT Pub. No.: WO2013/079047
PCT Pub. Date: Jun. 6, 2013

(65) Prior Publication Data
US 2014/0338498 A1    Nov. 20, 2014

(30) Foreign Application Priority Data

Nov. 30, 2011 (DE) .......................... 10 2011 087 474
Feb. 21, 2012 (DE) .......................... 10 2012 202 617
Jun. 19, 2012 (DE) .......................... 10 2012 210 250

(51) Int. Cl.
*F01N 11/00* (2006.01)
*F02N 11/00* (2006.01)
*F02N 15/02* (2006.01)
*F16D 41/00* (2006.01)

(52) U.S. Cl.
CPC ............ *F02N 11/00* (2013.01); *F02N 15/022* (2013.01); *F16D 41/00* (2013.01); *F02N 2250/08* (2013.01); *Y10T 74/134* (2015.01)

(58) Field of Classification Search
CPC ...... F02N 11/00; F02N 15/022; F02N 19/00; F02N 19/001; F02N 2250/08; F16D 41/00; F02C 7/275; Y10T 74/134
USPC .......................................... 123/179.1; 74/7 C
See application file for complete search history.

(56) References Cited

U.S. PATENT DOCUMENTS

| 4,860,604 A * | 8/1989 | Kinoshita | ............. F02N 15/046 475/149 |
| 7,559,303 B2 * | 7/2009 | Sakai | .................... F02N 15/023 123/179.25 |

FOREIGN PATENT DOCUMENTS

| EP | 1748180 A2 * | 1/2007 | ........... F02N 15/022 |
| EP | 1748181 A2 * | 1/2007 | ........... F02N 15/023 |
| EP | 1748202 A2 * | 1/2007 | ............ F02N 15/02 |
| JP | 2007126999 A * | 5/2007 | |

* cited by examiner

*Primary Examiner* — Grant Moubry
(74) *Attorney, Agent, or Firm* — Alfred J. Mangels (57) ABSTRACT

A torque transmission device for starting an internal combustion engine using a permanently engaged starter motor for a start-stop system. An annular gear connected with the starter motor includes a bearing for decoupling the starter motor from the engine based upon the rotational speed difference between the internal combustion engine and the starter motor. The device includes a freewheel for the speed-controlled coupling of the starter motor to the internal combustion engine so that torque is transmitted between the annular gear and the engine crankshaft. An annular gear carrier is arranged between the annular gear and the freewheel. The bearing and the freewheel are arranged radially relative to each other so that at least the freewheel and the bearing are in communication with an oil chamber of the engine. First and second seal elements are provided for sealing the engine oil chamber of the internal combustion engine.

17 Claims, 10 Drawing Sheets

TORQUE TRANSMISSION DEVICE

CROSS-REFERENCE TO RELATED APPLICATION

This application is the U.S. national phase application under 35 U.S.C. §371 of International Application Ser. No. PCT/DE2012/001090, having an international filing date of 14 Nov. 2012, and designating the United States, the entire contents of which are hereby incorporated by reference to the same extent as if fully rewritten.

BACKGROUND OF THE INVENTION

The invention concerns a torque transmission device and particularly concerns a permanently engaged starter (PES) for a start-stop system with a change-of-mind function. Already known PES systems include a bearing and a freewheel disposed outside of the engine oil chamber, i.e., in the dry area of the engine. PES systems located in the wet chamber of the engine have also been described, for example in EP 1 748 202 B1.

An object of the present invention is to provide an improved solution to offer advantages with regard to leak tightness, lubrication, assembly, and costs.

SUMMARY OF THE INVENTION

For achieving that object, the invention proposes various solutions that include the following features:

The invention uses a ball bearing for decoupling the differences in rotational speed between the engine and the starter, a freewheel for the speed-controlled coupling of the PES to the drive train of the engine, and two sealing elements for sealing the wet chamber of the engine from the transmission housing. Furthermore, the freewheel outer ring (FRAX) and the bearing inner ring are configured in one piece with each other and are preferably made out of a refinished drawn part. The bearing outer ring and the junctional region with the annular gear (intermediate ring) are likewise configured in one piece with each other and are made preferably out of a refinished blank.

The following features can be additionally or alternatively provided:

The component freewheel outer ring/bearing inner ring is connected by positive engagement and in a leak-proof manner with help of a flange element screwed on the crankshaft (KW), e.g., partially laser welded, and centered with respect to each other through radial surfaces.

In order to avoid refinishing because of distortion of the bearing raceways during welding, the weld seam is preferably made only partially.

A sealing element preferably made of an elastomer is arranged on the inner diameter of the bearing inner ring between the component freewheel outer ring/bearing inner ring and the flange element.

The component freewheel outer ring/bearing inner ring and the flange element are connected through the flex plate by positive engagement, for example riveted, and joined substantially without spacing at least in the region of the flange element.

The centering of the composite component freewheel outer ring/bearing inner ring and the flange element on the crankshaft is thus achieved with help of the flex plate. The flange element has a radial clearance to the crankshaft seat.

The annular gear is cold rolled and connected directly to the intermediate ring.

The connection of the annular gear is realized through positive engagement, optionally by riveting as a low-cost variant. In the case of a positive engagement through a weld joint, it is advantageous that the annular gear can be centered on the outside by welding so that a precise circular running is obtained. For this purpose, it is necessary to provide a spacing between the intermediate ring and the inner diameter of the annular gear carrier.

The different variants of the embodiment can be combined at least partially with one another.

An optimized lubricant supply at the freewheel can be achieved through suitable apertures on the component that forms the bearing outer ring and the freewheel inner ring.

In a torque transmission device using a starter motor for starting an internal combustion engine having an annular gear cooperating with the starter motor, and including a bearing for decoupling the difference in rotational speed between the internal combustion engine and the starter motor. The device further includes a freewheel for the speed-controlled coupling of the starter motor to the internal combustion engine, such that torque transmission takes place between the annular gear and a crankshaft of the internal combustion engine. The device includes still further an annular gear carrier arranged between the annular gear and the freewheel.

The above-described object is achieved by the fact that the bearing and the freewheel are arranged radially on top of each other such that at least the freewheel and the bearing communicate with an engine oil chamber of the internal combustion engine, and such that a first sealing element and a second sealing element are provided for sealing the engine oil chamber of the internal combustion engine. The freewheel is preferably arranged radially outside of the bearing, this bearing preferably being a rolling bearing, for example a ball bearing. The bearing serves to decouple the differences in rotational speed between the internal combustion engine and the starter motor. The freewheel serves for the speed-controlled coupling of the starter motor to a drive train in which the internal combustion engine comprising the torque transmission device of the invention is arranged. The two sealing elements serve to seal from a transmission housing the engine oil chamber that is also designated as a wet chamber.

A preferred example of an embodiment of the torque transmission device is characterized in that a bearing outer ring of the bearing and a freewheel inner ring of the freewheel are made in one piece with each other and form an outer bearing freewheel unit. The bearing outer ring and the freewheel inner ring are preferably constituted by a common race ring body. The common race ring body preferably includes radially on an inner side at least one running surface for rolling elements of the bearing. Radially on an outer side, the common race ring body preferably includes at least one running surface for freewheeling elements of the freewheel. Advantageously, the common race ring body is connected particularly integrally to an intermediate ring that constitutes a junction region for the annular gear.

A further preferred example of an embodiment of the torque transmission device is characterized in that, further, a bearing inner ring of the bearing and a freewheel outer ring of the freewheel are made in one piece with each other and form an inner bearing freewheel unit. The bearing inner ring preferably includes radially on an outer side at least one running surface for rolling elements of the bearing. Radially on an inner side the freewheel outer ring body includes at least one running surface for the freewheeling elements of the freewheel. The freewheel outer ring is made preferably in one piece with the bearing inner ring. The inner bearing freewheel unit preferably possesses a substantially U-shaped cross-section including a base from which two legs protrude at an angle. A radially inner leg of the inner bearing freewheel unit constitutes the bearing inner ring of the bearing. A radially outer leg of the inner bearing freewheel unit constitutes the freewheel outer ring.

A further preferred example of an embodiment of the torque transmission device is characterized in that a flex plate for torque transmission is provided between the internal combustion engine and a drive train, while being arranged directly adjacent to the inner bearing freewheel unit in an axial direction. The flex plate is preferably configured as a flexible component and serves for torque transmission between the crankshaft of the internal combustion engine and a clutch or a transmission. For this purpose, the flex plate is connected through a radially inner peripheral edge region to the crankshaft.

A further preferred example of an embodiment of the torque transmission device is characterized in that a radially widening gap is provided between the inner bearing freewheel unit and the flex plate. The flex plate can bear against the inner bearing freewheel unit in a radially inner region. In a radially outer region, the radially widening gap is deliberately arranged between the inner bearing freewheel unit and the flex plate. The radially widening gap is open in a radially outward direction.

A further preferred example of an embodiment of the torque transmission device is characterized in that the gap is filled at least partially with a material having a low modulus of elasticity, in particular with an elastomer. The material with the low modulus of elasticity advantageously enables the flex plate to be deformed or to move in a limited manner relative to the inner bearing freewheel unit. In this way, if necessary, an offset between the crankshaft and the clutch or the transmission can be compensated for.

A further preferred example of an embodiment of the torque transmission device is characterized in that the inner bearing freewheel unit is connected to a flange element that is fixed on the crankshaft. The flange element is fixed on the crankshaft with a radially inner peripheral edge region, for example with the help of a fixing means like screws. With a radially outer peripheral edge region the flange element is preferably fixed on the inner bearing freewheel unit.

A further preferred example of an embodiment of the torque transmission device is characterized in that the inner bearing freewheel unit is centered on an outer periphery of the flange element. For this purpose, the inner bearing freewheel unit is configured, as viewed in cross-section, for example with a step-like shoulder.

A further preferred example of an embodiment of the torque transmission device is characterized in that the inner bearing freewheel unit is connected to the flange element by fusion of material. The connection by fusion of material is preferably made as a welded joint. However, this welded joint is preferably not made as a continuous but only as a partial weld seam. In this way, an undesired refinishing of the bearing raceways because of distortion caused by welding can be avoided.

A further preferred example of an embodiment of the torque transmission device is characterized in that a further sealing element is arranged between the bearing inner ring of the inner bearing freewheel unit and the flange element. The further sealing element is preferably made of an elastomeric plastics material. The further sealing element is preferably arranged radially on the inside on the bearing inner ring.

A further preferred example of an embodiment of the torque transmission device is characterized in that a flex plate, or the flex plate, is fixed on the flange element. Advantageously, the flex plate is connected through positive engagement, for example by riveting on the flange element. A centering of the torque transmission device on the crankshaft is achieved in this case preferably through the flex plate. As a result, the flange element has a radial clearance relative to a crankshaft seat used for centering. A sealing element can be provided between the flange element and the bearing inner ring.

A further preferred example of an embodiment of the torque transmission device is characterized in that the annular gear is connected through positive engagement to an intermediate ring. In this case, however, attention must be paid to the fact that the concentric running of the annular gear follows the radial tolerances during riveting. Although this is relatively inexact, it has the advantage of being less expensive.

A further preferred example of an embodiment of the torque transmission device is characterized in that the annular gear is connected by fusion of material to an intermediate ring. The connection of the annular gear to the intermediate ring is realized preferably by welding, particularly by laser welding or by metal active gas welding. The connection by fusion of material offers the advantage that the annular gear, for example during welding, can be centered on the outside. In this way, an exact concentricity of running can be assured. This however makes it necessary to provide a certain spacing between the intermediate ring and an inner diameter of the annular gear carrier.

A further preferred example of an embodiment of the torque transmission device is characterized in that a further sealing element is arranged between a bearing inner ring of the bearing or the outer bearing freewheel unit and the crankshaft. In this way the sealing of the engine oil chamber relative to the transmission housing is improved.

A further preferred example of an embodiment of the torque transmission device is characterized in that the bearing and the freewheel are arranged radially within the first sealing element and the second sealing element. As a consequence, both the bearing and the freewheel preferably have a smaller diameter than the first and the second sealing element.

BRIEF DESCRIPTION OF THE DRAWINGS

Further advantages, features and details of the invention result from the following description in which different examples of embodiment are described in detail with reference to the appended drawings. The drawing figures show:

FIGS. 1a to 6b, altogether six variants of the torque transmission device of the invention, wherein the figures referenced with b are all reduced to PES parts and a flex plate, and FIGS. 7, 8a, 8b, 9, and 10, five further variants of the torque transmission device of the invention, in a semi-section.

DESCRIPTION OF THE PREFERRED EMBODIMENTS

Figure 5A:
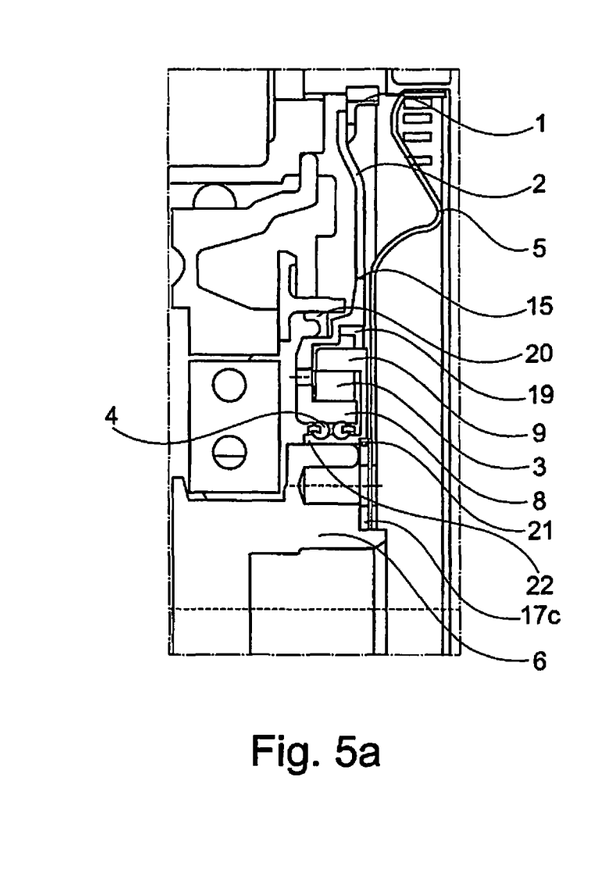
Figure 5B:
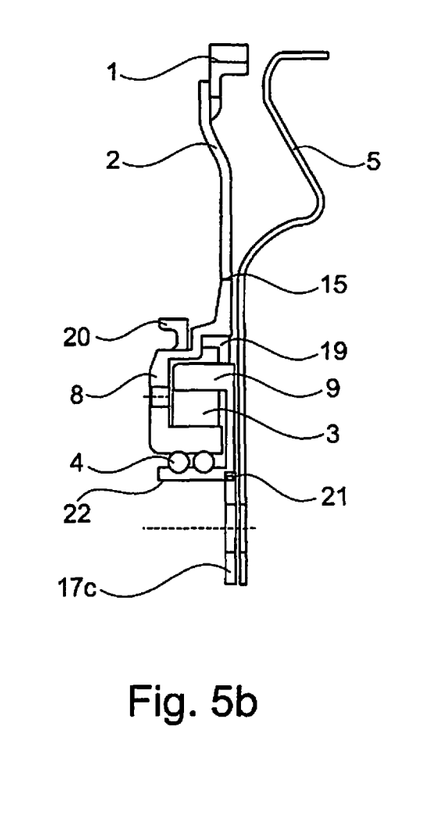
Figure 6A:
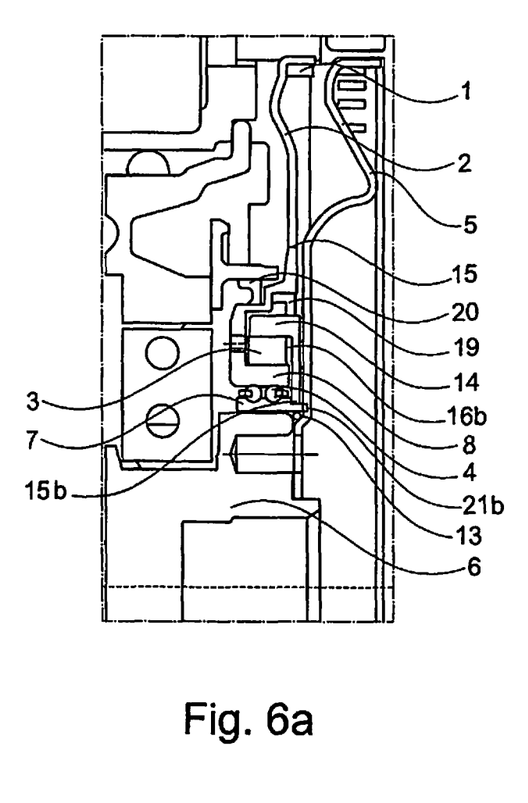
Figure 6B:
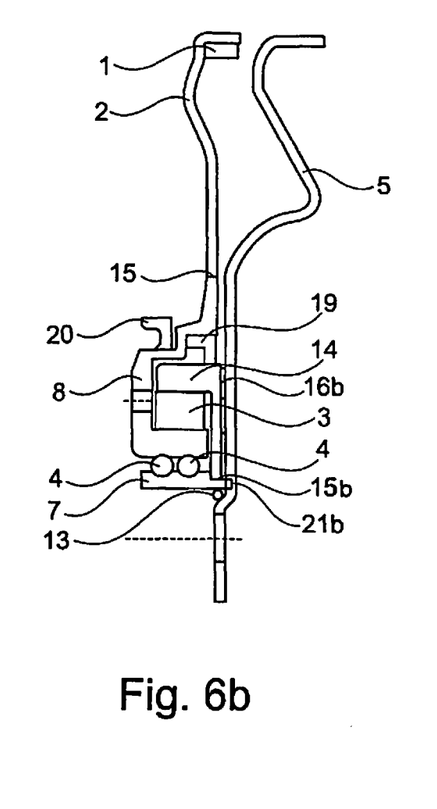
Figure 7:
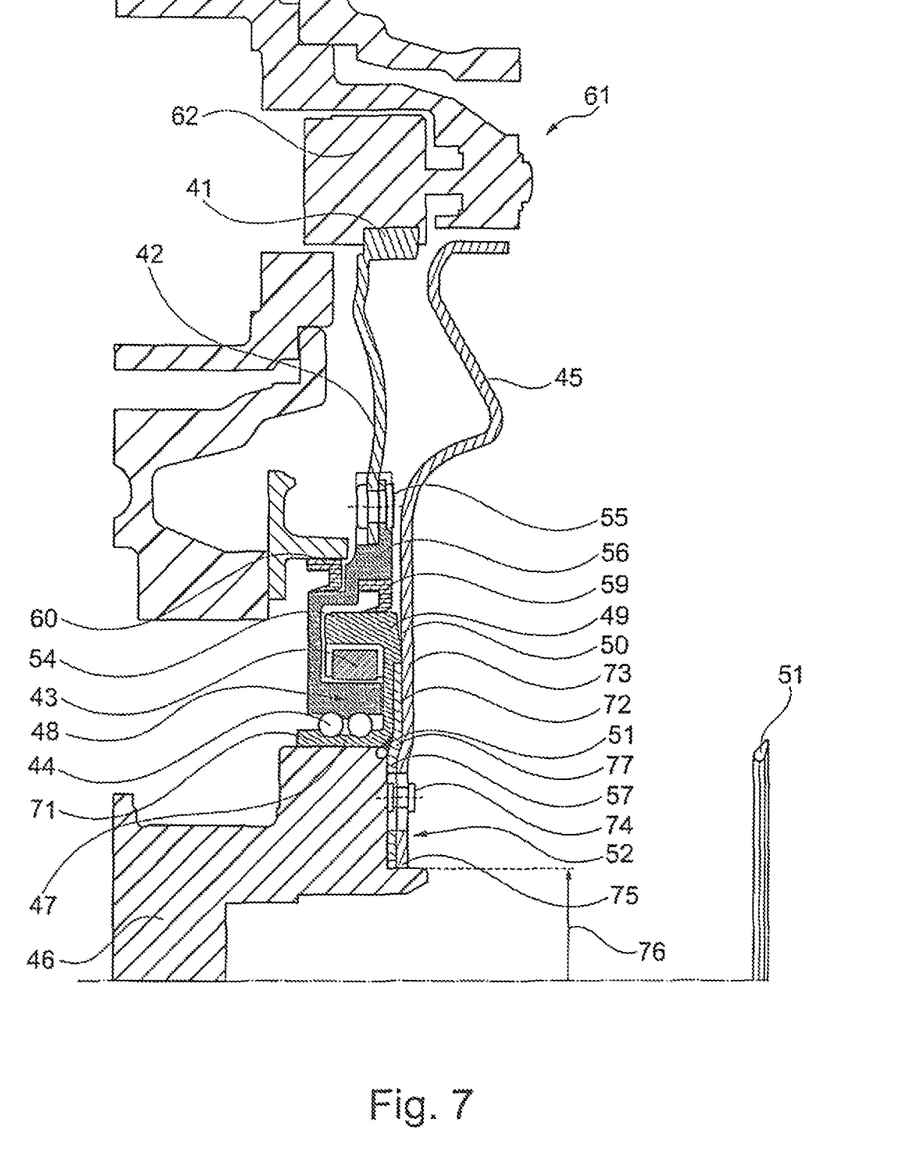
Figure 8A:
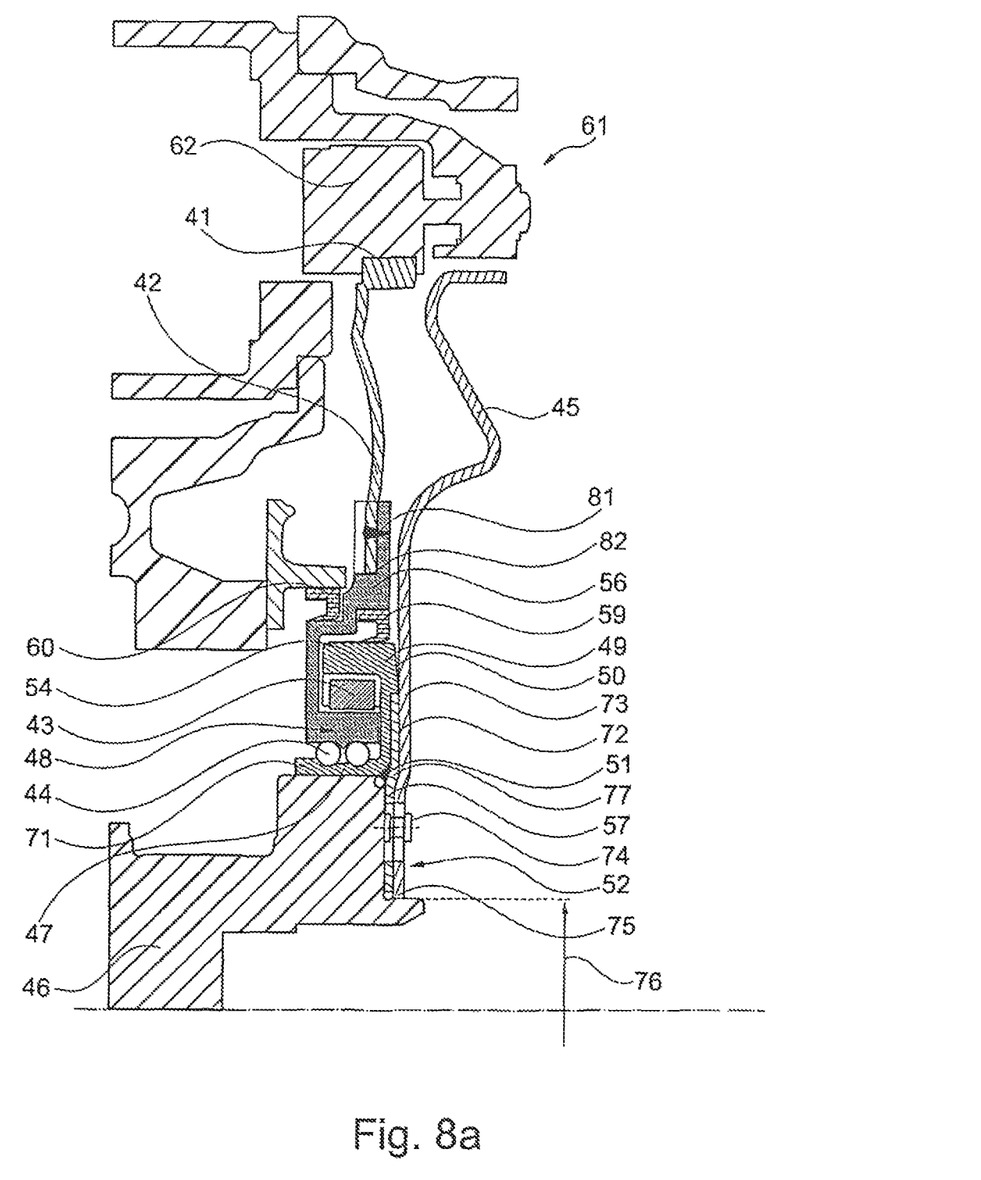
Figure 8B:
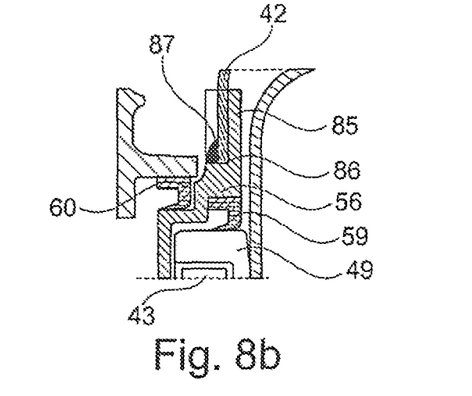
Figure 9:
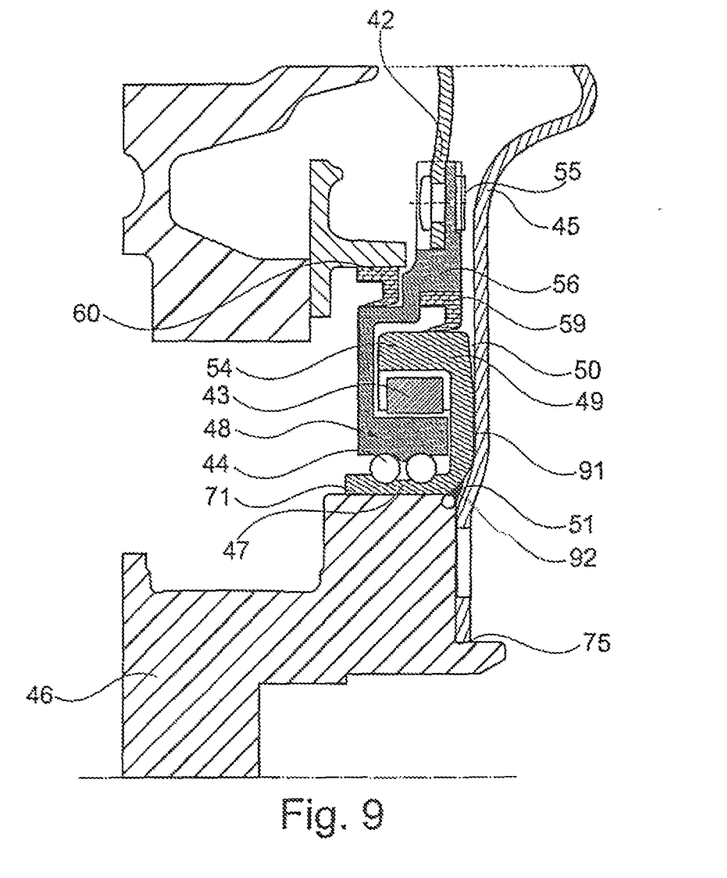
Figure 10:
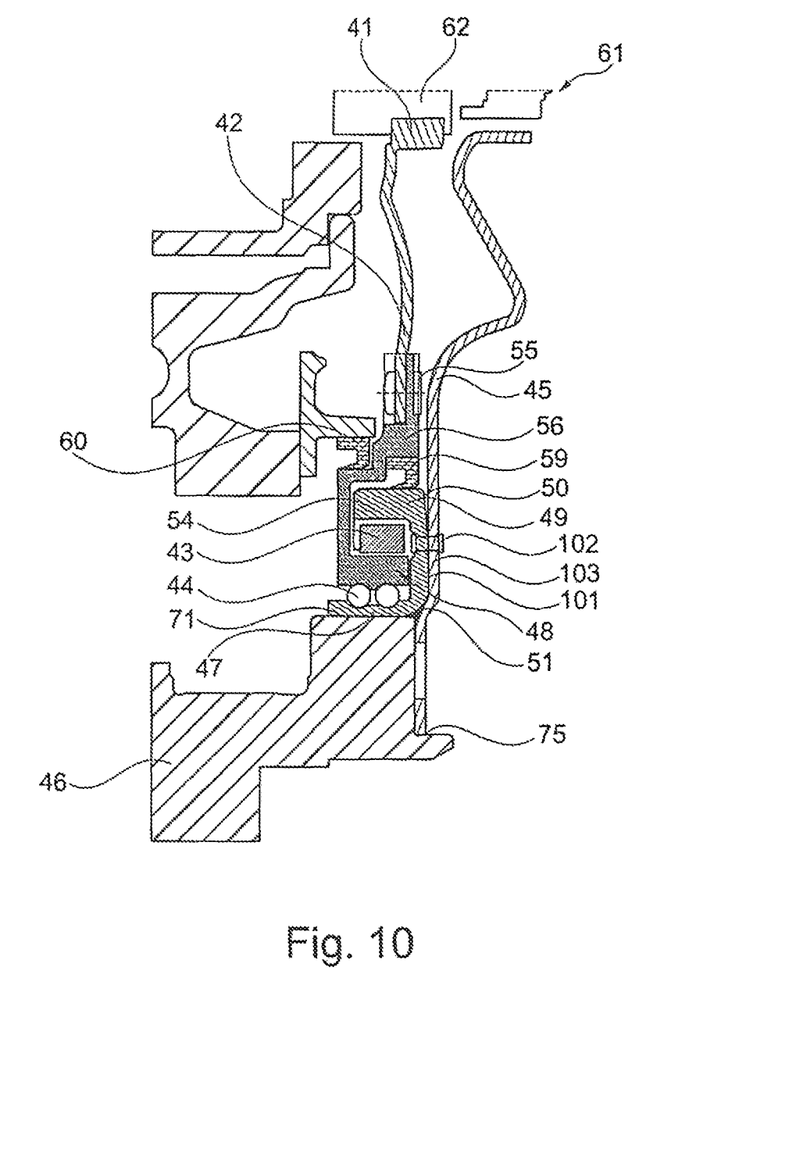

In FIGS. 1 to 10 a torque transmission device of the invention is represented in different variants. The torque transmission device shown in FIGS. 1a and 1b and in FIG. 7 includes an annular gear 1; 41 that is firmly connected to an annular gear carrier 2; 42 by a weld 15, as seen in FIGS. 1a and 1b. In FIGS. 7, 8a, and 10 it can be seen that a starter annular gear 62 of a starter motor 61 is meshed with the annular gear 41.

A freewheel 3; 43 and a bearing 4; 44 are integrated in the torque transmission device. The torque transmission device further includes a flex plate 5; 45 that is non-rotatably connected to a crankshaft 6; 46. Through the flex plate 5; 45 torque can be transmitted from the crankshaft 6; 46 to a transmission (not shown) arranged further downstream in a drive train of an automotive vehicle, or to an intermediately arranged clutch (not shown).

The bearing 4; 44 includes a bearing inner ring 7; 47 and a bearing outer ring. The bearing outer ring of the bearing 4; 44 is combined with a freewheel inner ring of the freewheel 3; 43 in an outer bearing freewheel unit 8; 48. In an inner bearing freewheel unit 9; 49 the bearing inner ring 7; 47 is combined with a freewheel outer ring 14; 54.

The inner bearing freewheel unit 9; 49 has a substantially U-shaped cross-section with a base from which two legs extend at an angle. The base of the U-shaped cross-section extends substantially in the radial direction. The term radial relates to an axis of rotation of the torque transmission device that is indicated through a chain-dotted line.

The radially inner leg of the U-shaped cross-section is constituted by the bearing inner ring 7; 47. The radially outer leg of the U-shaped cross-section is constituted by the freewheel outer ring 14; 54. The two legs of the U-shaped cross-section extend parallel to each other in axial direction, i.e., parallel to the axis of rotation of the torque transmission device.

A radially outward extending gap 10; 50 is formed between the base of the inner bearing freewheel unit 9; 49 and the flex plate 5; 45 that includes a matched pot-shaped section. Radially within the gap 10; 50, the flex plate 5, 45 bears directly, or indirectly with interposition of a further element, against the inner bearing freewheel unit 9; 49.

A sealing element 11; 51 is arranged radially on an inner side on the inner bearing freewheel unit 9; 49. The sealing element 11; 51 serves to seal the bearing inner ring 7, 47 of the inner bearing freewheel unit 9; 49 and the crankshaft relative to each other.

Figure 3A:
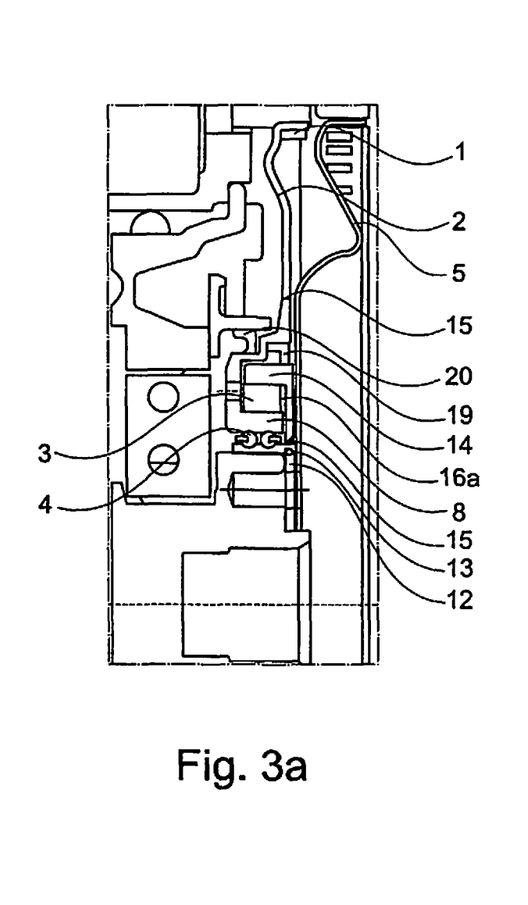
Figure 3B:
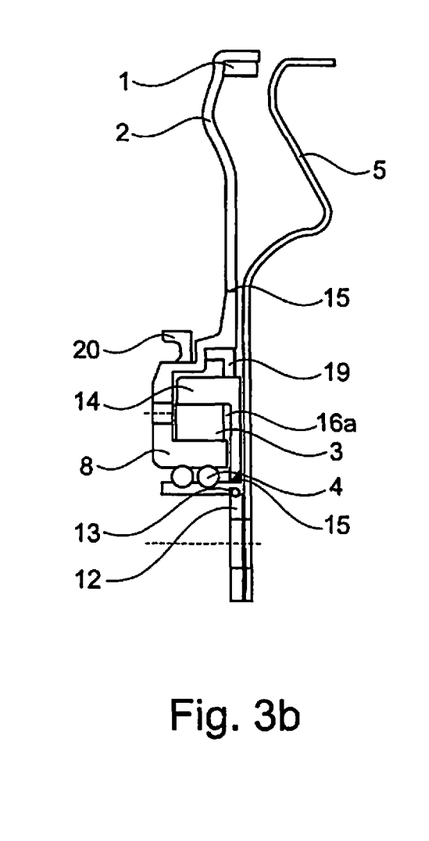

Further, the bearing inner ring 7; 47 is combined with a covering disk/a covering sheet metal/a flange element 17a; 17b; 17c or a flange element 57, into a unit 12; 52. As can be seen for example in FIG. 7, the flange element 57 is connected through a riveted joint 74 by positive engagement to the flex plate 45. FIGS. 3a and 3b show that the freewheel outer ring 14 can also be combined by a weld joint 15 into a unit 12 made up of bearing inner ring/covering disk.

A gap filling is indicated at 16a in FIGS. 3a and 3b. In FIGS. 6a and 6b the gap filling is referenced as 16b.

Figure 1A:
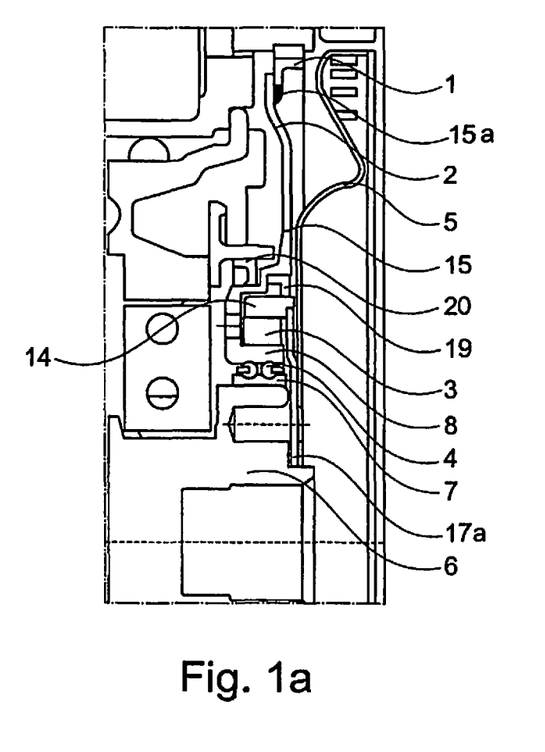
Figure 1B:
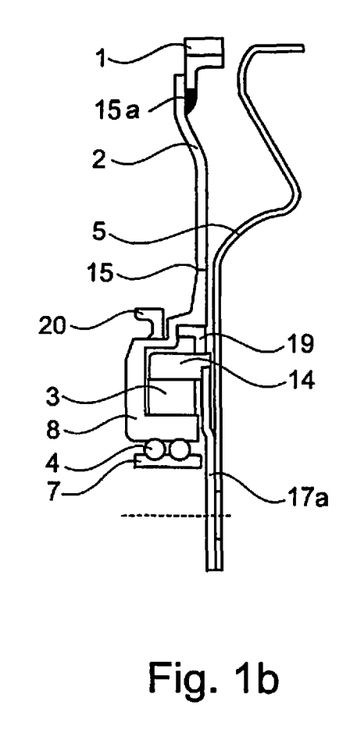
Figure 4A:
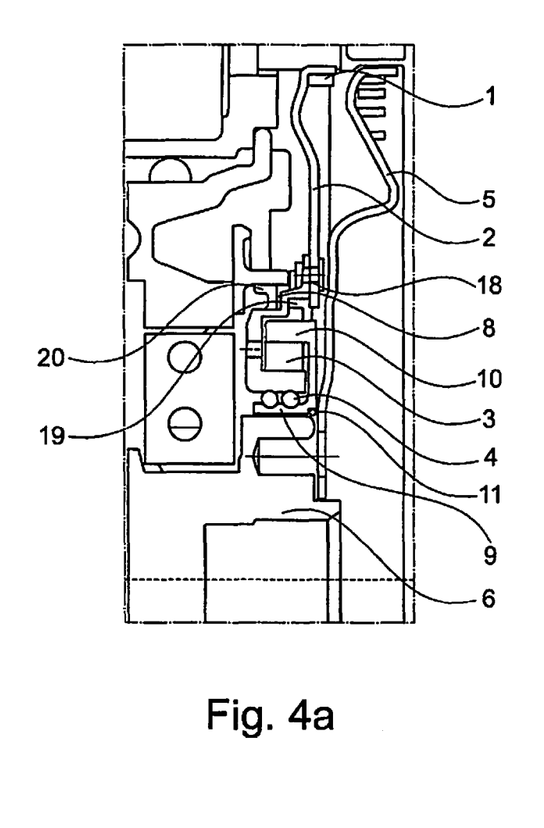
Figure 4B:
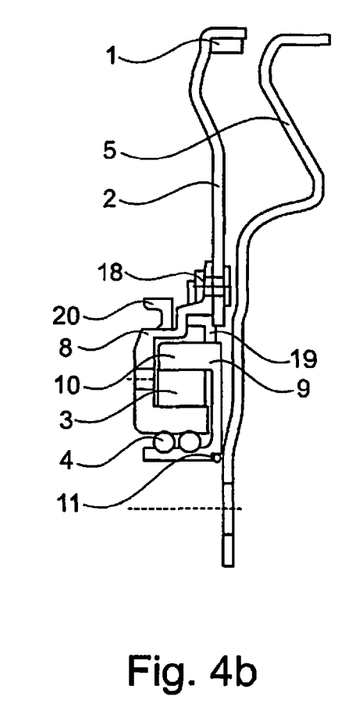

The annular gear carrier 2, as can be seen for example in FIGS. 1a and 1b, is fixed by a weld joint 15 to an intermediate ring that forms a part of the outer bearing freewheel unit 8. FIGS. 4a and 4b show that the attachment of the annular gear carrier 2 with the intermediate ring of the outer bearing freewheel unit 8 can also be realized through riveted joints 18.

For sealing the engine oil chamber from the transmission housing two sealing elements 19, 20; 59, 60 are integrated in the torque transmission device. The sealing element 20; 60 is arranged radially outside of the outer bearing freewheel unit 8; 48. The sealing element 19; 59 is arranged in the radial direction between the inner bearing freewheel unit 9; 49 and the outer bearing freewheel unit 8; 48.

In FIGS. 5a and 5b it is indicated at 21 that the covering disk 17c can be connected by positive engagement through a toothed connection to the inner bearing freewheel unit 9. A sealing element 22 serves for sealing between the crankshaft 6 and the inner bearing freewheel unit 9.

In FIGS. 6a and 6b it can be seen that the bearing inner ring 7 is connected with help of a toothed connection 21b by positive engagement to the flex plate 5. Moreover, the bearing inner ring 7 is connected by the weld joint 15b by fusion of material to the freewheel outer ring 14.

In the variant V1 of FIG. 1a and FIG. 1b, the bearing outer ring and the freewheel inner ring are made in one piece with each other, and the annular gear carrier and the annular gear are made in two pieces and connected to each other by welding. The sealing in the direction of the crankshaft is achieved through a press fit on the bearing inner ring without additional sealing elements.

Figure 2A:
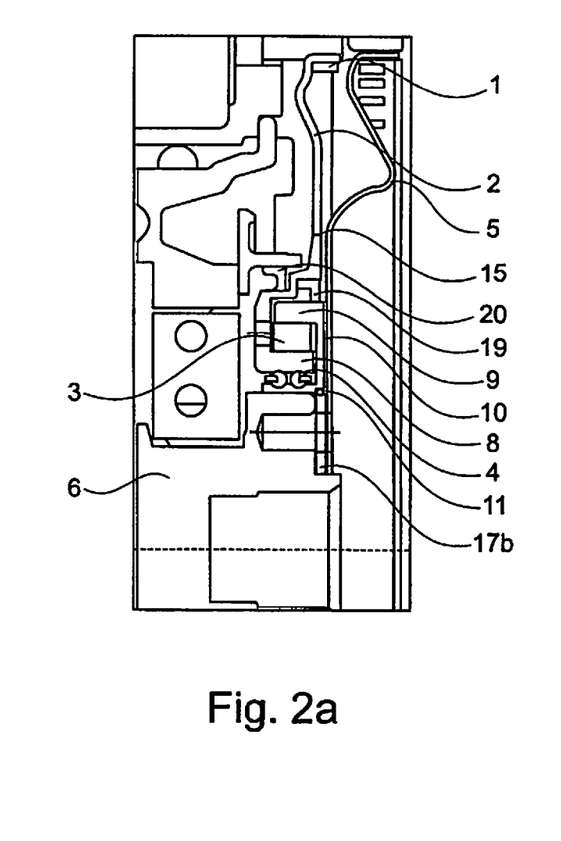
Figure 2B:
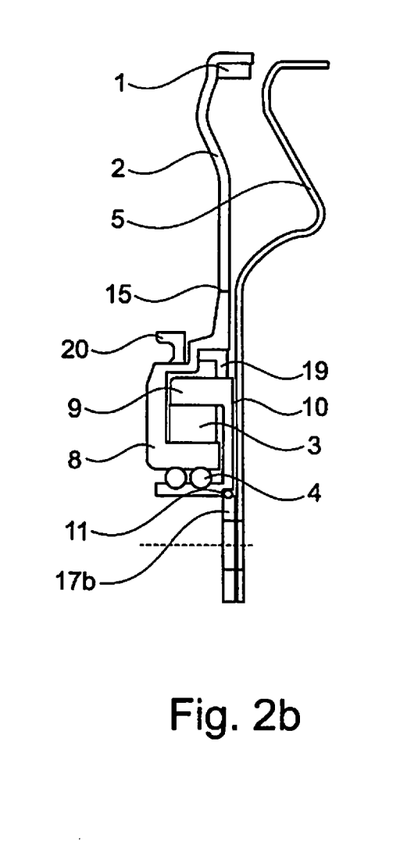

In the variant V2 of FIG. 2a and FIG. 2b, the bearing outer ring and the freewheel inner ring are configured in one piece with each other. The bearing inner ring and the freewheel inner ring are likewise made in one piece with each other, with a gap to the flex plate widening in a radially outward direction. The covering disk under the flex plate, the annular gear, and also the annular gear carrier are formed by rolling in one piece with one another and are subsequently welded-on. The sealing in the direction of the crankshaft is achieved through a sealing element (in this case, an O-ring) between bearing inner ring/flex plate/covering disk. The torque of the PES is supported solely through a press fit on the bearing inner ring.

Variant V3, represented in FIG. 3a and FIG. 3b, corresponds substantially to variant V2 except that the bearing inner ring and the covering disk are made in one piece with each other. The freewheel outer ring is connected by fusion of material (in this case, by welding), or by positive engagement to the bearing inner ring/covering disk, the sealing in the direction of the crankshaft being realized with help of a sealing element (here, an O-ring) on the element made up of bearing inner ring/covering disk. The gap between the freewheel outer ring and the flex plate is filled with a material having a low modulus of elasticity, for example an elastomer which can be deformed in correspondence to a movement of the flex plate. The torque of the PES is supported on the screw connection of the crankshaft.

Variant V4 of FIG. 4a and FIG. 4b corresponds substantially to variant V2 except that, in this case, the covering disk is omitted. It is solely the flex plate that is screwed to the crankshaft. The annular gear and the annular gear carrier are made in one piece with each other by rolling and are attached by riveting (or by screwing). A sealing element in the direction of the crankshaft (here an O-ring) is arranged between the flex plate and the bearing inner ring. The annular gear carrier secures the sealing from migrating to the exterior.

Variant V5 shown in FIG. 5a and FIG. 5b corresponds substantially to variant V2 except that the covering sheet metal for supporting the torque is connected to the bearing inner ring through positive engagement (here in form of a toothed connection). The sealing in the direction of the crankshaft is realized through a sealing element (here an annular ring) arranged on the end of the bearing inner ring facing the engine. The annular gear carrier and the annular gear are made in two pieces and are welded-on.

Variant V6 of FIGS. 6a and 6b corresponds substantially to variant V3 except that the flex plate is connected directly to the crankshaft and, for supporting the torque, also by positive engagement (here in the form of a toothed connection) to the bearing inner ring. The sealing in the direction of the crankshaft is realized through a sealing element (here an O-ring) that is arranged radially between the bearing inner ring and the crankshaft screw connection of the flex plate. The gap between the freewheel outer ring and the flex plate is filled up with a material having a low modulus of elasticity (for example an elastomer) which can deform in correspondence to movements of the flex plate.

The different individual structural variants of embodiments V1-V6 can be combined with one another with regard to the embossing of the annular gear carrier with the starter annular gear and its connection, and also for the sealing of the wet chamber of the engine in the direction of the crankshaft connection geometry. This is indicated in the foregoing text for example, optionally, annular gear carrier and annular gear made to standard in two pieces, or in one piece by shaping through rolling or, for example, optionally, the fixing of the annular gear carrier through a weld joint or by riveting or screwing etc.

An optimized lubricant supply on the freewheel can be achieved through suitable apertures provided in the component which forms the bearing outer ring and the freewheel inner ring.

In the exemplary embodiment represented in FIG. 7, the annular gear 41 is provided with cold-rolled teeth. The annular gear carrier 42 is fixed on the intermediate ring 56 through the riveted joints 55. The flex plate 45 is provided with a matched pot-shaped section. The inner bearing freewheel unit 49 is made as a refinished drawn part. One point 71 indicates a transition fit between the bearing inner ring 47 and the crankshaft 46. The transition fit simplifies mounting and demounting.

At one point 72, the flex plate 45 bears against the flange element 57. At one point 74 a riveted joint is indicated between the flex plate 45 and the flange element 57. The riveted joint 74 serves for the pre-assembly prior to or after a partial welding-on of the flange element 57 to the inner bearing freewheel unit 49. The partial welding-on is indicated at one point 73.

At one point 75, it is indicated that the centering of the torque transmission device on the crankshaft 46 is achieved through the flex plate 45. An associated centering diameter is indicated through an arrow 76. At one point 77, it is indicated that for sealing between the bearing inner ring 47, or the flange element 57, and the crankshaft 46, a special sealing element made out of an elastomeric plastics material is used.

It is indicated at one point 81 in FIG. 8a that the annular gear carrier 42 is connected through fusion of material by a welded joint to the intermediate ring 56. At one point 82, is represented a centering gap for the radial centering of the annular gear carrier 42 prior to welding. The connection through fusion of material, for example by laser welding or MAG welding, is made after the external centering when the concentric running of the annular gear 41 is found to be satisfactory.

In FIG. 8b is represented a detail out of FIG. 8a of a further variant. At one point 85 it can be seen that the annular gear carrier 42 bears against the intermediate ring 56. At one point 86, is represented a centering gap for the radial centering of the annular gear carrier 42 prior to the welding step. At one point 87 is indicated a weld seam for the connection through fusion of material between the annular gear carrier 42 and the intermediate ring 56.

In the exemplary embodiment illustrated in FIG. 9, it can be seen that the flex plate 45 bears directly against the inner bearing freewheel unit 49 at one point 91. At one point 92, it is indicated that the flex plate 45 is connected through fusion of material by a welded joint 51 to the inner bearing freewheel unit 49. The connection through fusion of material is advantageously configured as a partial weld joint with a low heat input.

In the exemplary embodiment represented in FIG. 10, similar to the exemplary embodiment represented in FIG. 9, the torque transmission device is centered on the crankshaft 46 through the flex plate 45 at the point 75. At one point 101, the flex plate 45 bears against the inner bearing freewheel unit 49. At one point 102, it is indicated that for a pre-assembly, the flex plate 45 can be riveted to the inner bearing freewheel unit 49. For the purpose of sealing, a sealing element made of a suitable plastics material can be arranged at one point 103 between the inner bearing freewheel unit 49 and the flex plate 45.

The invention claimed is:

1. A torque transmission device for starting an internal combustion engine using a starter motor, said device comprising:
    an annular gear cooperatively engaged with the starter motor,
    a bearing for decoupling the a difference in rotational speed between the internal combustion engine and the starter motor, the bearing including an inner bearing ring and an outer bearing ring,
    a freewheel for a speed-controlled coupling of the starter motor to the internal combustion engine such that torque transmission takes place between the annular gear and a crankshaft of the internal combustion engine, wherein the freewheel includes a freewheel inner ring and a freewheel outer ring, and
    an annular gear carrier arranged between the annular gear and the freewheel,
    wherein the bearing and the freewheel are arranged radially relative to an engine crankshaft axis such that at least the freewheel and the bearing communicate with an engine oil chamber of the internal combustion engine,
    wherein a first sealing element and a second sealing element are provided for sealing the engine oil chamber of the internal combustion engine, and
    wherein the freewheel inner ring serves as the outer bearing ring.

2. The torque transmission device according to claim 1, wherein the outer bearing ring of the bearing and the freewheel inner ring of the freewheel are formed in one piece with each other and together form an outer bearing freewheel unit.

3. The torque transmission device according to claim 1, wherein the inner bearing ring of the bearing and the freewheel outer ring of the freewheel are formed in one piece with each other and together define an inner bearing freewheel unit.

4. The torque transmission device according to claim 3, wherein a flex plate for transmission of torque is provided between the internal combustion engine and a drive train and is arranged directly adjacent to the inner bearing freewheel unit in an axial direction of the engine crankshaft.

5. The torque transmission device according to claim 4, wherein a radially outwardly widening gap is provided between the inner bearing freewheel unit and the flex plate.

6. The torque transmission device according to claim 3, wherein the inner bearing freewheel unit is connected to a flange element that is connected to the crankshaft.

7. The torque transmission device according to claim 6, wherein the inner bearing freewheel unit is centered on an outer periphery of the flange element.

8. The torque transmission device according to claim 6, wherein the inner bearing freewheel unit is connected to the flange element through fusion of material.

9. The torque transmission device according to claim 6, wherein a flex plate is affixed to the flange element.

10. The torque transmission device according to claim 1, wherein the annular gear carrier is connected to an intermediate ring through a non-rotatable engagement.

11. The torque transmission device according to claim 1, wherein the annular gear carrier is connected to an intermediate ring fusion of material.

12. The torque transmission device according to claim 1, wherein the bearing and the freewheel are arranged radially inside of the first sealing element and inside of the second sealing element.

13. The torque transmission device according to claim 1, wherein the annular gear carrier is non-rotatably connected to the outer bearing ring of the bearing.

14. The torque transmission device according to claim 13, wherein a freewheel unit is radially received between the outer bearing ring and the annular gear carrier.

15. A torque transmission device for starting an internal combustion engine using a starter motor, said device comprising:
- an annular gear cooperatively engaged with the starter motor;
- a bearing for decoupling the a difference in rotational speed between the internal combustion engine and the starter motor;
- a freewheel for a speed-controlled coupling of the starter motor to the internal combustion engine such that torque transmission takes place between the annular gear and a crankshaft of the internal combustion engine; and
- an annular gear carrier arranged between the annular gear and the freewheel;
- wherein the bearing and the freewheel are arranged radially relative to an engine crankshaft axis such that at least the freewheel and the bearing communicate with an engine oil chamber of the internal combustion engine;
- wherein a first sealing element and a second sealing element are provided for sealing the engine oil chamber of the internal combustion engine;
- wherein a bearing inner ring of the bearing and a freewheel outer ring of the freewheel are formed in one piece with each other and together define an inner bearing free
- wherein a bearing inner ring of the bearing and a freewheel outer ring of the freewheel are formed in one piece with each other and together define an inner bearing freewheel unit;
- wherein a flex plate for transmission of torque is provided between the internal combustion engine and a drive train and is arranged directly adjacent to the inner bearing freewheel unit in an axial direction of the engine crankshaft;
- wherein a radially outwardly widening gap is provided between the inner bearing freewheel unit and the flex plate; and
- wherein the gap is at least partially filled with an elastomeric material having a low modulus of elasticity.

16. A torque transmission device for starting an internal combustion engine using a starter motor, said device comprising:
- an annular gear cooperatively engaged with the starter motor;
- a bearing for decoupling the a difference in rotational speed between the internal combustion engine and the starter motor;
- a freewheel for a speed-controlled coupling of the starter motor to the internal combustion engine such that torque transmission takes place between the annular gear and a crankshaft of the internal combustion engine; and
- an annular gear carrier arranged between the annular gear and the freewheel;
- wherein the bearing and the freewheel are arranged radially relative to an engine crankshaft axis such that at least the freewheel and the bearing communicate with an engine oil chamber of the internal combustion engine;
- wherein a first sealing element and a second sealing element are provided for sealing the engine oil chamber of the internal combustion engine; and
- wherein a bearing inner ring of the bearing and a freewheel outer ring of the freewheel are formed in one piece with each other and together define an inner bearing freewheel unit;
- wherein the inner bearing freewheel unit is connected to a flange element that is connected to the crankshaft; and
- wherein a further sealing element is arranged between the bearing inner ring of the inner bearing freewheel unit and a flange element.

17. A torque transmission device for starting an internal combustion engine using a starter motor, said device comprising:
- an annular gear cooperatively engaged with the starter motor;
- a bearing for decoupling the a difference in rotational speed between the internal combustion engine and the starter motor;
- a freewheel for a speed-controlled coupling of the starter motor to the internal combustion engine such that torque transmission takes place between the annular gear and a crankshaft of the internal combustion engine; and
- an annular gear carrier arranged between the annular gear and the freewheel;
- wherein the bearing and the freewheel are arranged radially relative to an engine crankshaft axis such that at least the freewheel and the bearing communicate with an engine oil chamber of the internal combustion engine;
- wherein a first sealing element and a second sealing element are provided for sealing the engine oil chamber of the internal combustion engine;
- wherein a third sealing element is arranged between one of a bearing inner ring of the bearing or an outer bearing freewheel unit and the crankshaft.

* * * * *